United States Patent Office 3,217,044
Patented Nov. 9, 1965

3,217,044
HIGHLY CHLORINATED ARYL SULFIDES AND PROCESS FOR THE MANUFACTURE THEREOF
Helmut Klug, Gersthofen, near Augsburg, Germany, assignor to Farbwerke Hoechst Aktiengesellschaft vormals Meister Lucius & Bruning, Frankfurt am Main, Germany, a corporation of Germany
No Drawing. Filed July 19, 1961, Ser. No. 125,077
Claims priority, application Germany, July 21, 1960, F 31,716; May 12, 1961, F 33,912
4 Claims. (Cl. 260—609)

The present invention relates to the manufacture of highly chlorinated aryl sulfides.

From the category of the halogenated aryl sulfides there have hitherto only become known compounds with a relatively low content of halogen. The 4,4'-dichlorodiphenylsulfide and the tri- and tetrachlorodiphenylsulfide have, for example, been described in the literature as derivatives of diphenylsulfide. By direct chlorination of thianthrene there has hitherto been prepared the 2,7-dichlorothianthrene as compound having the highest chlorine content the structure of which, however, has not yet precisely been defined.

The objects of the present invention are aryl sulfides having a high chlorine content, i.e. aryl sulfides containing in the molecule at least 6 chlorine atoms, and a process for the manufacture of such products. The highly chlorinated aryl sulfides correspond to the general formula (I)
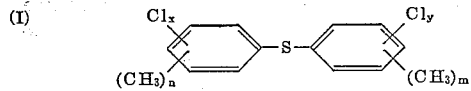

or (II)
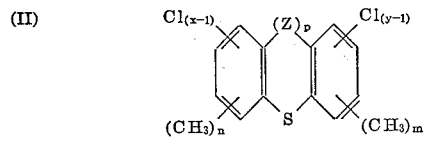

in which $n$ and $m$ are whole numbers from 0 to 2, $x$ and $y$ are whole numbers from 3 to 5, $p$ is the whole number 0 or 1 and Z represents oxygen, sulfur, selenium or tellurium. The sum of $n$ and $x$, or of $m$ and $y$, shall be $\leq 5$.

Now I have found, and this being unexpected, that highly chlorinated aryl sulfides of the above-mentioned Formulae I or II, in which $n$, $m$, $x$, $y$, $p$ and Z have the above-cited meaning, are obtained when benzene or the derivatives thereof containing one or two methyl groups, or compounds of the general formula (III)
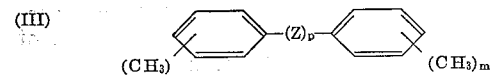

in which $m$, $n$, $p$ and Z have the afore-mentioned meaning, are chlorinated in the presence of sulfur and/or sulfur halides, preferably in the presence of Friedel-Crafts catalysts.

As starting materials for the manufacture of the highly chlorinated aryl sulfides, there may be used, for example, benzene, toluene, ortho-, meta- and para-xylene or the isomer mixtures thereof, diphenyl, ditolyl, diphenyl ether, diphenyl sulfide, 2,2'-dimethyldiphenylether, 4,4'-dimethyldiphenylether, 2,2'-dimethyldiphenylsulfide, 4,4'-dimethyldiphenylsulfide, diphenyl selenide and diphenyl telluride and the methyl derivatives of diphenyl, diphenyl ether, diphenyl selenide and diphenyl telluride with up to two methyl groups per aromatic ring. Instead of the compounds mentioned there may also be used products as starting materials which contain already some chlorine atoms in the molecule. There are mentioned, for example, mono- or dichlorobenzenes, mono- and dichlorotoluenes or -xylenes chlorinated in the nucleus which are not substituted in at least one ortho- or para-position to the methyl group in the aromatic ring, 4,4'-dichlorodiphenyl, 4,4-dichlorodiphenylether, 4,4'-dichlorodiphenylsulfide, etc. The starting materials can also first be prechlorinated in the nucleus according to a known process and then, with the addition of sulfur and/or sulfur chlorides, be chlorinated further according to the process of the invention.

The chlorination is carried out in the presence of sulfur and/or sulfur halides, such as sulfur monochloride or sulfur dichloride. There is preferably used elementary sulfur since from this sulfur there are formed sulfur halides, and application of the elementary sulfur constitutes the most economic method. Sulfur or the sulfur chlorides, such as mono- and dichloride, essentially serve as sulfur suppliers. However, it does not seem to be impossible that, to a certain extent, they also serve as chlorination agents since the equilibrium

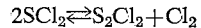

must be taken into account. Instead of the sulfur chlorides there may be used sulfur bromides or sulfur iodides, however, the chlorides are preferred.

As chlorination agents there may be used, for example, gaseous or liquid chlorine. Especially satisfactory is the known chlorination method with sulfuryl chloride. It is recommended, both when carrying out the chlorination with elementary chlorine and when applying sulfuryl chloride, also to use catalysts promoting the nuclear substitution, especially Friedel-Crafts catalysts. There may be used preferably aluminum chloride, however, instead of aluminum chloride there may also be used iron chloride, zinc chloride, titanium tetrachloride, antimony pentachloride, bismuth trichloride, boron trifluoride or iodide, or mixtures of said compounds. Compounds which give off aluminum or iron ions in the reaction, such as metallic aluminum, fuller's earth or argillaceous earth, etc., are also suitable for this purpose.

The chlorination reaction can be carried out under reduced, normal or elevated pressure in a discontinuous or continuous manner. It may be advantageous to use solvents or diluents. As such there may be used sulfuryl chloride, furthermore carbon tetrachloride, chloroform, tri- and tetrachloroethylene, hexachlorethane, perchlorobutadiene, hexachloro-cyclopentadiene, nitrobenzene, trichloromonofluoromethane, trifluorochloroethylene and other substances that do not react with chlorine or sulfuryl chloride or only to a small extent. The application of superatmospheric pressure may be necessitated, for example, by the use of solvents or sulfuryl chloride when the operation is carried out at temperatures above the boiling point of the solvents or of the sulfuryl chloride.

The chlorination reaction is suitably carried out at temperatures ranging from 0° to about 150° C. Temperatures within the range of 20° to 100° C. are preferred, while normally the operation is carried out at temperatures of about 70° C. In many cases the chlorination can first be carried out at a low temperature, up to about 50° C., until the condensation reaction is finished. Later on it is recommended to apply higher temperatures, up to about 60° to 75° C. Temperatures above 150° C. can only be used when the products formed do not show decomposition phenomena. Tests have shown that, by the exhaustive chlorination of diphenyl sulfide or of thianthrene at temperatures above 150° C., for example, there is obtained hexachlorobenzene with the cleavage of the sulfur bridges.

The degree of chlorination of the compound formed depends on the quantity and the concentration of the chlorination agent or catalyst participating in the reaction, and also on the temperature participating in the reaction. Low temperatures promote the formation of compounds in which the highest degree of chlorination that is theoretically possible is not yet attained. In contrast thereto a higher catalyst concentration generally leads to the formation of compounds having the highest degree of chlorination. After compounds are formed simultaneously which have different degrees of chlorination.

A chlorination of the methyl groups does not in general take place. Only when a considerable excess of chlorine is applied does chlorination of the methyl groups occur. The application of a surplus of 100 mole percent of chlorination agents, calculated on the halogen-free compound applied, generally does not lead to an attack on the methyl groups to a noticeable degree.

The application of higher temperatures and, above all, the use of a sufficient quantity of chlorination agents promote the formation of perchlorinated derivatives. Also the choice of the chlorination catalyst influences the progress of the chlorination to a certain extent. Thus the chlorination of benzene, carried out in the presence of sulfur dichloride, generally leads to highly chlorinated derivatives of diphenyl sulfide whereas the presence of sulfur monochloride promotes the formation of highly chlorinated derivatives of thianthrene. However, there does not exist a clear dependence in this respect since also numerous exceptions can be observed. Sulfur monochloride can, moreover, be converted into sulfur dichloride intermediately, especially when an excess quantity of chlorination agents is applied.

The operation is generally carried out with amounts of chloride or sulfuryl chloride which do not exceed the theoretically calculated amounts or only exceed these amounts to an insignificant degree. Although it is quite possible to apply a surplus of 100 mole percent, calculated on the starting material applied, the economy of the process is prejudiced. Relatively small surpluses of from 5 to 20 percent generally suffice. In exceptional cases it may be advantageous to increase the excessive amount of chlorination agents up to 50 percent.

Depending on the choice of the reaction conditions there are obtained, as mentioned already, highly chlorinated derivatives of various chlorination degrees. When applying simple aromatic hydrocarbons such as benzene, toluene or xylene, derivatives of diphenyl sulfide or of thianthrene are obtained. The use of diphenyl or the derivatives thereof leads to compounds which are derived from diphenylene sulfide, while the use of diphenyl ether leads to dibenzo-1,4-oxthiines. In addition thereto there are formed, especially with the use of diphenyl sulfide and diphenyl ether as starting materials, changing amounts of sulfur-containing resins. It is quite possible to separate mixtures of the two categories of compounds of the polychlorodiphenylsulfides and the polychlorothianthrenes since polychlorothianthrenes are sparingly soluble and can be separated from the readily soluble polychlorodiphensulfides by extraction with solvents. While in the manufacture of the unchlorinated diphenyl sulfide the excess quantity of sulfur applied in the known processes must be dissolved out with carbon disulfide in a troublesome manner or be removed by boiling with sodium hydroxide solution, the surplus amount of sulfur can, according to the process of the present invention—even when mixtures are formed—either be distilled off as sulfur chloride or be dissolved out in this form by the application of other solvents in which the sulfur chloride has an essentially higher solubility than sulfur in carbon disulfide. The process renders possible from the beginning the application of mixtures of starting materials which, after chlorination, can be separated into uniform reaction products in a simple and easy manner by fractionated crystallization. This is an essential advantage on account of the fact that mixtures of un- chlorinated diphenyl sulfide and thianthrene can be separated with great difficulty only.

The highly chlorinated aryl sulfides of the Formulae I and II, in which $m$, $n$, $p$, $x$, $y$ and $Z$ have the above-mentioned meaning, are remarkably stable. They can be used as stabilizers, particularly for chlorine-containing high polymers, as pesticides, as flame-proofing agents, as additives to lubricants, as antioxidants and as vulcanization accelerators. The compounds can be used as such and also in admixture with one another. In the molten state they are suitable as stable, warm transmitting liquids. The high molecular weight resins may be used, for example, as casting resin, especially for the cable industry and for lining condensers. The compounds are, furthermore, suitable as intermediate products for the production of pharmaceutical preparations, pesticides and chlorine-containing di- and polycarboxylic acids.

The following examples serve to illustrate the invention, but they are not intended to limit it thereto:

EXAMPLE 1

257.5 g. of sulfur dichloride (2.5 moles), diluted with 810 g. of sulfuryl chloride (6 moles) were added dropwise to a suspension of 10 g. of anhydrous aluminum chloride in 184 g. of toluene (2 moles), while stirring well. A vigorous splitting off of sulfur dioxide and hydrogen chloride set in. After the addition of another 810 g. of sulfuryl chloride, the temperature was raised to about 70° C. When the reaction mixture was afterheated for three hours at the same temperature, the mixture solidified substantially. After comminution, the excess quantity of sulfuryl chloride was decomposed by the addition of dilute alcohol, and the remaining greenish-yellow crystalline residue was filtered off with suction. When this residue was dried and three times recrystallized from xylene, octachloroditolyl sulfide corresponding to the general formula

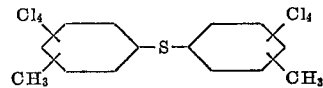

was obtained.

Flowing point: 282° to 283° C. (not corrected)
Yield: 114 g.
Slight yellow rhombi.

From the mother liquor there were isolated further fractions with lower chlorine contents, corresponding approximately to heptachloroditolylsulfide and hexachloroditolylsulfide and the mixtures thereof.

EXAMPLE 2

A mixture of 810 g. of sulfuryl chloride (6 moles) and 337.5 g. of sulfur monochloride (2.5 moles) was introduced slowly, while stirring well, into a suspension of 5 g. of anhydrous aluminum chloride in 92 g. of toluene (1 mole). The reaction was discontinued after heating for three hours at 70° C. at the reflux condenser.

The crude product which was isolated after decomposition with alcohol of 50% strength was extracted several times with hot xylene in order to be free from soluble portions and finally recrystallized from hot tetrahydronaphthalene. The yield amounted to 87 g.

The product crystallizing in felted white needles and melting at about 380° C. was hexachloro-, x,x'-dimethylthianthrene of the general formula

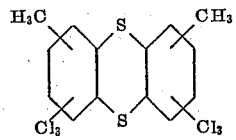

The portion dissolved in the xylene was a mixture of highly chlorinated ditolyl sulfides.

EXAMPLE 3

78 g. of benzene (1 mole) were reacted in the presence of 10 g. of aluminum chloride, in the manner as described in Example 2, with 810 g. of sulfuryl chloride (6 moles) and 337.5 g. of sulfur monochloride (2.5 moles).

In a manner analogous to Example 2 there was obtained octachlorothianthrene corresponding to the general formula

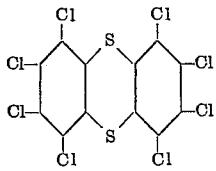

Yield: 148 g.

It must be noted that the flowing point of octachlorothianthrene is situated above 400° C. The preparation largely resembles the perchlorinated dimethyl thianthrene described in Example 2 both as regards solubility and appearance and also in respect of the other behaviour.

EXAMPLE 4

Within 60 minutes, 81 g. of sulfur monochloride (0.6 mole) were added dropwise, at room temperature, to a mixture of 92 g. of toluene (1 mole), 200 g. of carbon tetrachloride and 5 g. of aluminum chloride. While stirring well and gradually raising the temperature to 70° C., 340 g. of chlorine (8 moles+20% surplus) were introduced into the batch in the course of 24 hours.

A light yellow crystalline deposit that had precipitated in the course of the reaction in a large quantity was filtered off with suction, boiled first with dilute hydrochloric acid and then with distilled water and dried.

Yield: 194 g.

The substance had an approximate flowing point of 253° to 257° C. The flowing point of the product that had been recrystallized several times from xylene was 279° to 281° C. (not corrected). As regards its analysis data, the preparation corresponds to a mixture of about equal parts of heptachloroditolylsulfide and octachloroditolylsulfide.

Appearance: Slight yellow, inhomogeneous mass interspersed with needle- and rhomb-shaped crystals.

EXAMPLE 5

170 g. of technically pure diphenyl ether (1 mole) were dissolved in 200 g. of carbon tetrachloride. After the addition of 10 g. of aluminum chloride and 64 g. of sulfur (2 moles), 1350 g. of chlorine (38 moles) were introduced into this solution at 60° C. in the course of 24 hours, in the course of which operation a white crystalline mass began to precipitate from the batch. Then there was separated first the carbon tetrachloride by distillation under normal pressure and part of the sulfur dichloride present in the reaction mixture in an excess quantity. Then the residual quantity of the sulfur dichloride was removed by vacuum distillation.

The solid, largely crystalline residue was three times triturated with 200 cc. of petroleum ether, respectively, and after each washing separated from the mother liquor by filtration under pressure.

235 g. of a white, completely crystalline residue remained behind which was sparingly soluble in the usual organic solvents and had a melting point of 311° to 315° C. After recrystallization from xylene, the flowing point rose to 320° to 321° C. (not corrected).

According to its analysis data, the compound was octachlorodibenzo-1,4-oxthiine corresponding to the formula

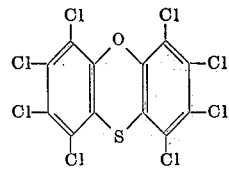

When distilling off the combined petroleum ether extracts, there remained behind 182 g. of a light yellow resin the composition of which was not closely examined.

EXAMPLE 6

223 g. of 4,4'-dichlorodiphenyl obtained according to known processes by the chlorination of diphenyl in the presence of 0.5% by weight of iodine were dissolved in 200 g. of carbon tetrachloride and, after the addition of 64 g. of sulfur (2 moles) and 10 g. of anhydrous aluminum chloride, chlorinated in the manner described in Example 1. After distilling off the carbon tetrachloride and the excess quantity of sulfur dichloride 485 g. of a partially crystalline residue were obtained which, in order to remove the adherent aluminum chloride, was washed three times with 250 g. of distilled water, respectively, while stirring vigorously, dried and treated three times with 200 cc. of petroleum ether, respectively, in order to be freed from noncrystalline resinous portions, 330 g. of a crystalline crude product remained behind. The product obtained was, according to analysis, octachlorodiphenylene sulfide of the formula

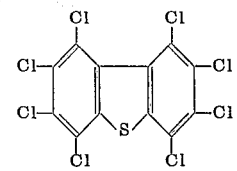

After having been recrystallized several times from xylene, the product had a flowing point of 290° to 292° C. (not corrected). The portion of 88 g. dissolved in petroleum ether was a light brown, solid resin that was not closely examined.

EXAMPLE 7

To a solution of 1125 g. of monochlorobenzene in 2000 g. of carbon tetrachloride were added first 50 g. of aluminum chloride and then, in the course of 60 minutes, 640 g. of sulfur at room temperature. Then gaseous chlorine was passed into the mixture in the course of 72 hours at the rate of 120 g. per hour. The excess quantity of sulfur dichloride contained in the reaction mixture was distilled off together with part of the carbon tetrachloride the evaporation losses of which were replenished by adding measured quantities of a total of 1500 g. of carbon tetrachloride. After the termination of the chlorination, the actual processing began when 2 l. of distilled water were added dropwise, with agitation, to the reaction mixture which was heated at 70° C. In this operation, an azeotropic mixture of carbon tetrachloride and water distilled off while simultaneously the remaining aluminum chloride decomposed. The remaining aqueous suspension was filtered and the crystalline residue that remained behind in an approximate yield of 2672 g. recrystallized from hot xylene by fractional crystallization.

There were obtained 1019 g. of a fraction consisting substantially of enneachlorodiphenyl sulfide (after having been recrystallized once from xylene the product had a flowing point of 298° to 304° C.), 102 g. of an intermediate fraction having a flowing point of 273° to 298° C. (also after having once been recrystallized from xylene), 193 g. of a residue of octachlorothianthrene being almost insoluble in hot xylene, flowing point approximately 410° to 414° C. (not corrected).

EXAMPLE 8

27 g. of sulfur monochloride were added, at room temperature, to a mixture of 106 g. of ortho-xylene and 5 g. of aluminum chloride. Upon the further addition of a mixture of 485 g. of sulfuryl chloride and another 27 g. of sulfur monochloride a strong generating of hydrogen chloride and sulfur dioxide set in. After the generating of gas had declined, the reaction was continued for one hour at 70° C. and for another hour at 90° C. The residue remaining behind after the distillation of the surplus sulfuryl chloride was thrice triturated with 500 g. of water, respectively, and then boiled with 300 g. of benzene. 124 g. of a solid crystalline mass remained behind as residue. When this residue had three times been recrystallized from xylene, a heterogeneous crystalline mass was obtained which consisted of needles and rhombi and had a flowing point of 278° to 280° C. (not corrected). The compound is apparently an isomer mixture of bis-o-xylyl-x,x',x'',y,y',y'' - hexachlorophenyl - x''',y''' - sulfide. The amount of the sidechain chlorine was less than 1%.

I claim:
1. A compound of the formula

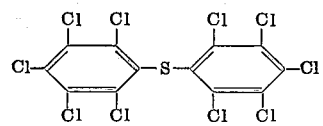

2. The process for the manufacture of an aryl sulfide highly chlorinated in the aromatic nucleus which comprises contacting (1) a compound selected from the group consisting of benzene, toluene, xylene, a substitution product thereof chlorinated in the aromatic nucleus and, containing up to 2 chlorine atoms in the nucleus, and a compound of the formula

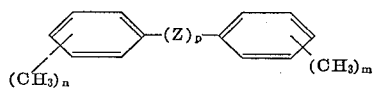

in which $n$ and $m$ are whole numbers from 0 to 2, $p$ is a whole number from 0 to 1 and Z represents a member selected from the group consisting of oxygen and sulfur with (2) a member selected from the group consisting of chlorine and sulfuryl chloride in the presence of (3) a member selected from the group consisting of sulfur, sulfur monochloride and sulfur dichloride.

3. The process of claim 2 wherein the chlorination is carried out in the presence of a Friedel-Crafts catalyst.

4. The process of claim 2 wherein the chlorination is carried out in the presence of aluminum chloride.

References Cited by the Examiner
UNITED STATES PATENTS
2,221,819  11/40  Smith et al. _____ 260—327

OTHER REFERENCES
Cherntsov et al.: Zhurnal Obshchei Khim 29, 2271–2275 (1959). Cited in Chemical Abstracts 54, 9816i (1960).

Reed: Organic Chemistry of Bivalent Sulfur, vol. 11, 1960, page 48.

CHARLES B. PARKER, *Primary Examiner.*

IRVING MARCUS, DANIEL D. HORWITZ, *Examiners.*